(12) United States Patent
Oh et al.

(10) Patent No.: US 7,611,368 B2
(45) Date of Patent: Nov. 3, 2009

(54) BACKLIGHT ASSEMBLY AND ASSEMBLING METHOD THEREOF

(75) Inventors: Seok Hwan Oh, Gumi-si (KR); Sang Mook Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/149,937

(22) Filed: May 9, 2008

(65) Prior Publication Data
US 2009/0021938 A1    Jan. 22, 2009

(30) Foreign Application Priority Data
May 11, 2007    (KR) ...................... 10-2007-0046187

(51) Int. Cl.
*H01R 33/08*    (2006.01)

(52) U.S. Cl. ........................ 439/239; 362/633; 362/634

(58) Field of Classification Search ................. 362/217; 439/226, 669.2, 232
See application file for complete search history.

(56) References Cited

U.S. PATENT DOCUMENTS

| 2,247,117 | A | * | 6/1941 | De Reamer | ................. 439/241 |
| 2,457,780 | A | * | 12/1948 | Levenson | ................ 200/51.09 |
| 6,343,942 | B1 | * | 2/2002 | Okamoto | .................... 439/110 |
| 7,090,376 | B2 | * | 8/2006 | Kang et al. | ................. 362/225 |
| 7,175,301 | B2 | * | 2/2007 | Lee et al. | .................... 362/225 |

* cited by examiner

*Primary Examiner*—Briggitte R Hammond
(74) *Attorney, Agent, or Firm*—McKenna Long & Aldridge LLP

(57) ABSTRACT

A backlight assembly includes: lamps; lamp holders each holding at least one of opposite ends of a corresponding one of the lamps, the lamp holders being electrically connected with external electrodes of the lamps; and a lower frame formed to partially cover the lamp holders such that the lower frame is formed in one unified body with the lamp holders.

5 Claims, 9 Drawing Sheets

BACKLIGHT ASSEMBLY AND ASSEMBLING METHOD THEREOF

This application claims the benefit of the Korean Patent Application No. 10-2007-0046187, filed on May 11, 2007 which is hereby incorporated by reference for all purposes as if fully set forth herein.

BACKGROUND OF THE INVENTION

1. Field of the Invention

The present invention relates to a backlight assembly and an assembling method thereof.

2. Discussion of the Related Art

Liquid crystal display (LCD) devices exhibit an expanded application range by virtue of lightness, thinness, low power consumption, etc. Such an LCD device includes an LCD module and a driving circuit for driving the LCD module.

The LCD module includes an LCD panel having liquid crystal cells arranged in the form of a matrix between two glass substrates, and a backlight assembly for irradiating light to the LCD panel.

The backlight assembly includes a plurality of lamps for irradiating light to the LCD panel, side frames for enclosing opposite ends of the lamps, respectively, lamp holders for supplying an AC voltage to the lamps, and lower frames, to which the lamp holders are fastened by screws. Each lamp includes an external electrode fluorescent lamp (EEFL). In such an EEFL, plasma discharge is generated when discharge voltages, namely, positive and negative AC voltages, are applied to external electrodes arranged at opposite ends of the lamp, respectively, so that light is emitted.

To prevent the lamps from vibrating due to the AC voltages and to prevent the lamp holders from vibrating due to an electromagnetic force generated in the lamps, ribs are protruded from each side frame toward the corresponding lower frame, to fix the lamp holders in a pressed state. Although such ribs are used to reduce noise generation, they may strike the lamp holders due to vibrations when there is a gap between the ribs and the external electrodes. In this case, noise may be rather severer.

In order to solve this problem, pads are interposed between the external electrodes and the ribs to reduce the gap formed between the lamp holders and the ribs. However, the attachment of the pads may cause additional processing time, increased assembly time, and increased cost.

SUMMARY OF THE INVENTION

Accordingly, the present invention is directed to a backlight assembly and an assembling method thereof that substantially obviate one or more problems due to limitations and disadvantages of the related art.

An advantage of the present invention is to provide a backlight assembly and an assembling method thereof, which are capable of simplifying an assembling process for the backlight assembly.

Another advantage of the present invention is to provide a backlight assembly and an assembling method thereof, which are capable of reducing noise generated from the backlight assembly without necessitating any additional element.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a backlight assembly includes: lamps; lamp holders each holding at least one of opposite ends of a corresponding one of the lamps, the lamp holders being electrically connected with external electrodes of the lamps; and a lower frame formed to partially cover the lamp holders such that the lower frame is formed in one unified body with the lamp holders.

In another aspect of the present invention, an assembling method of a backlight assembly includes: preparing a lower frame formed to partially cover lamp holders such that the lower frame is formed in a unified body with the lamp holders; and holding lamps in the lamp holders such that each lamp is held by a corresponding one of the lamp holders at at least one of opposite ends of the lamp.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention.

In the drawings:

FIGS. 2A and 2B illustrate lamp holders and a lower frame according to a first embodiment of the present invention, in which FIG. 2A is a perspective view, and FIG. 2B is a sectional view;

FIGS. 3A and 3B illustrate lamp holders and a lower frame according to a second embodiment of the present invention, in which FIG. 3A is a perspective view, and FIG. 3B is a sectional view;

FIGS. 4A to 4C illustrate lamp holders and a lower frame according to a third embodiment of the present invention, in which FIGS. 4A and 4B are perspective views, and FIG. 4C is a sectional view.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Exemplary embodiments of the present invention will be described in detail with reference to FIGS. 1 to 5.

Figure 1:
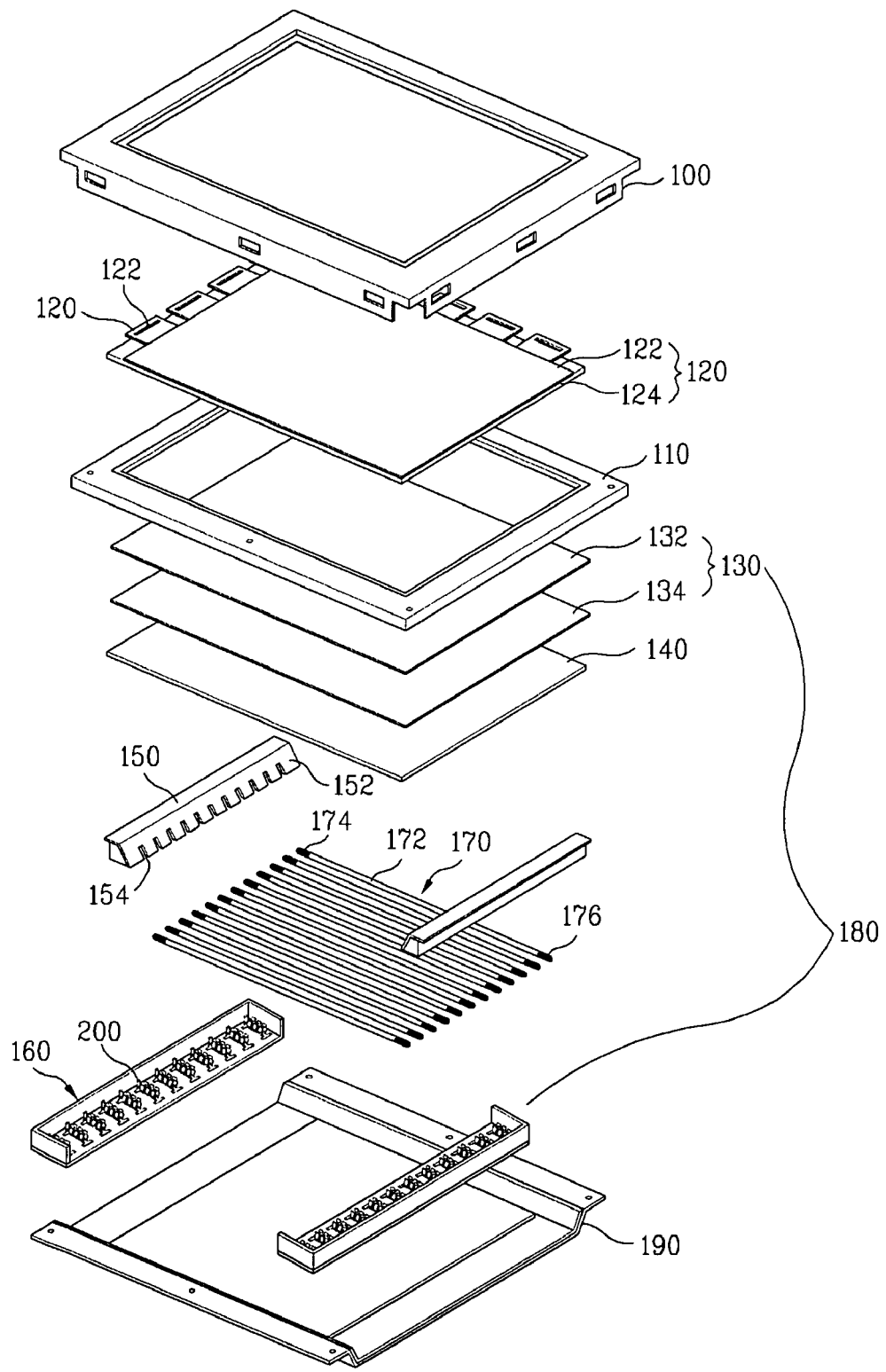
FIG. 1 is an exploded perspective view illustrating a liquid crystal display (LCD) device according to a first embodiment of the present invention.

FIG. 1 is an exploded perspective view illustrating a liquid crystal display (LCD) device according to a first embodiment of the present invention.

Referring to FIG. 1, the LCD device includes an LCD panel 120 for displaying an image when a corresponding image signal is applied to the LCD panel 120, and a backlight assembly 180 for supplying light to the LCD panel 120. The LCD device also includes a panel guide 110 and upper and lower cases 100 and 190, to receive the LCD panel 120 and backlight assembly 180.

The upper case 100 has a bent structure to enclose a non-display region on a front surface of the LCD panel 120 and side surfaces of the lower case 190. The upper case 100 is fastened to a panel guide 110 enclosing the side surfaces of the lower case 190, so that the upper case 100 is fixed.

The lower case 190 has a rectangular frame structure. The lower case 190 has a space defined in the interior of the lower case 190 to receive the backlight assembly 180 while supporting the backlight assembly 180 on the bottom of the lower case 190.

The panel guide 110 prevents the backlight assembly 180 from moving and absorbs external impact applied to the backlight assembly 180. The panel guide 110, made of a synthetic resin or plastic material, effectively insulates a driving circuit of the LCD device.

The LCD panel 120 includes a thin film transistor (TFT) substrate 124 and a color filter substrate 122 facing the TFT substrate 124. Liquid crystals (not shown) are sealed between the TFT substrate 124 and the color filter substrate 122. The LCD panel 120 displays an image by controlling the light transmittance of the liquid crystals, using TFTs arranged in the form of a matrix as switching elements. R, G, and B color filters are formed on the color filter substrate 122, for color rendering. As light emerging from the liquid crystals passes through R, G, and B pixels, it exhibits desired colors. Thus, a color image is rendered.

The backlight assembly 180 includes a plurality of lamps 170 for emitting light, an optical sheet member 130 for guiding the light from the lamps 170, two side frames 150 for enclosing opposite ends of the lamps 170, respectively, a plurality of lamp holders 200 for holding the opposite ends of the lamps, respectively, and two lower frames 160 for firmly supporting the lamp holders 200 at the opposite ends of the lamps 170, respectively.

Each lamp 170 includes an external electrode fluorescent lamp (EEFL) arranged at the back side of the LCD panel 120. Each lamp 170 includes a lamp tube 172 for emitting light, and first and second external electrodes 174 and 176 for applying discharge voltages to the lamp tube 172, respectively. In the EEFL 170, the first and second external electrodes 174 and 176 are formed on respective peripheral surfaces of the opposite ends of the lamp tube 172, respectively. A discharge gas is filled in the lamp tube 172. The first and second external electrodes 174 and 176 are arranged such that each of the first and second external electrodes 174 and 176 overlap with a discharge space of the corresponding lamp tube 172 via the corresponding lamp tube 172. Thus, the first and second external electrodes 174 and 176 provide a plurality of capacitors having the same capacitance. When discharge voltages are applied to the first and second external electrodes 174 and 176 of each EEFL 170, respectively, plasma discharge is generated in the lamp tube 172, so that light is emitted.

The optical sheet member 130 includes a prism sheet 134 and a protection sheet 132. The prism sheet 134 concentrates light emerging from a diffusion plate 140, to enhance both brightness and viewing angle. The protection sheet 132 is arranged on the prism sheet 134, to protect the prism sheet 134 which is sensitive to dust or scratch. The protection sheet 132 also prevents the optical sheet member 130 from moving during a transportation of the backlight assembly 170 alone.

The diffusion plate 140 uniformly distributes light emerging from the lamps 170 over the overall surface of diffusion plate 140, and then guides the light toward the LCD panel 120. To this end, the diffusion plate 140 is made of a polycarbonate, which is transparent and has heat resistance, or an acrylic resin, which is transparent and is excellent in terms of refractive index.

The side frames 150 are fastened to the lower frames 160, respectively. The side frames 150 enclose the opposite ends of each lamp 170 fitted in the corresponding lamp holders 200, respectively. To this end, each side frame 150 has an inclined surface 152 for reflecting light emitted from the lamps 170, and lamp holes 154 in which portions of the lamps 170 positioned near the corresponding ends of the lamps 170 are fitted, respectively.

Figure 2A:
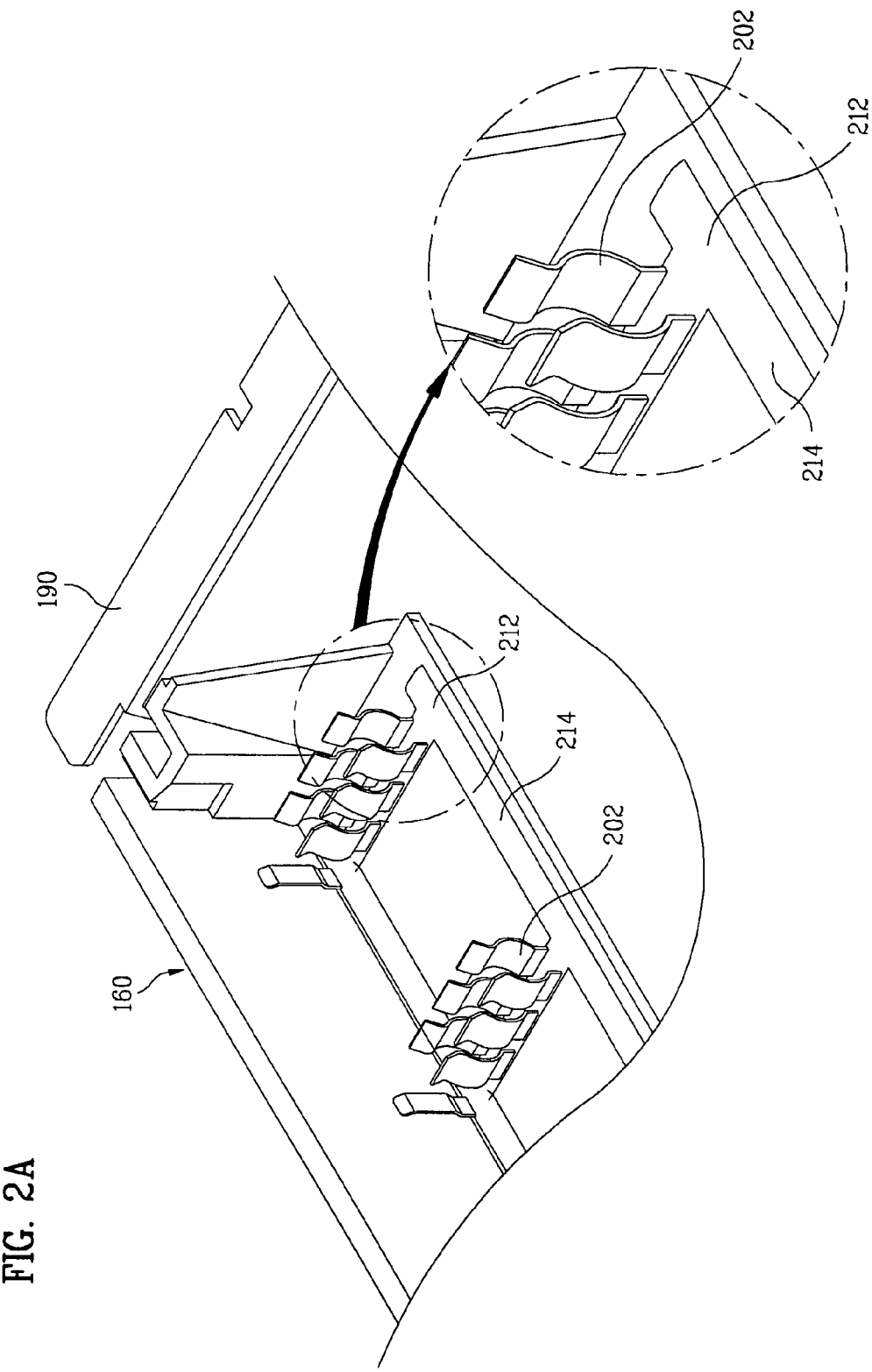
Figure 2B:
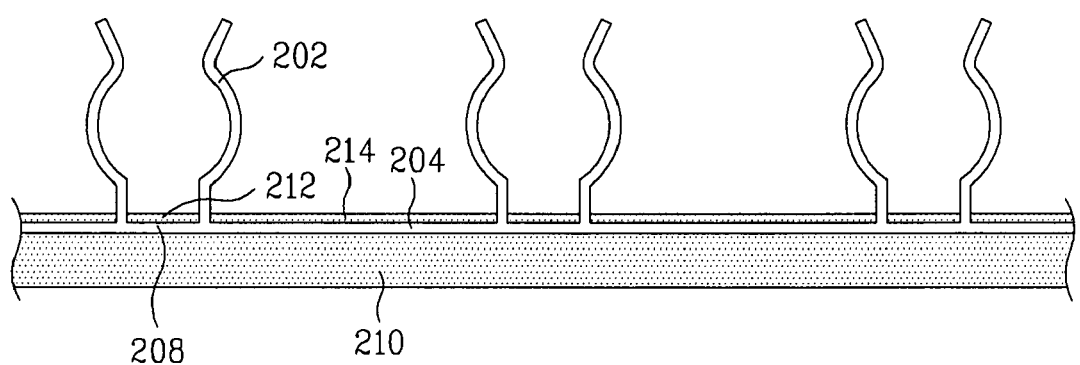

Each lamp holder 200 mounted on the lower frames 160 holds either the one end of the lamps 170 or the other end opposite to the one end of the lamps 170 arranged in parallel while being spaced apart from one another, as shown in FIGS. 2A and 2B. Each lamp holder 200 is electrically connected with a corresponding one of the first and second external electrodes 174 of the corresponding lamp 170. To this end, each lamp holder 200 includes a plurality of lamp clips 202 for holding the corresponding lamp 170, and a plurality of supporters 208 for supporting the lamp clips 202, connector 204 for connecting one ends and the other end of the supporters 208.

The lower frames 160 are fastened to the side frames 150, to maintain the lamp holders 200 in a fixed state. To this end, each lower frame 160 includes a seat 210 on which the lamp holders 200 and the side frame 150 are seated, and movement preventing members 212 and 214 for maintaining the lamp holders 200 in a fixed state. The movement preventing members may have various structures, as shown in FIGS. 2A to 5.

In an embodiment illustrated in FIGS. 2A and 2B, the movement preventing members 212 and 214 are configured to cover the supporters 208 and connectors 204 of the lamp holders 200, except for the lamp clips 203 which hold the lamps 170. That is, the movement preventing members 212 and 214 are overlapped with the seat 210 of the lower frame 160 via the supporters 208 and connectors 204 formed between the seat 210 of the lower frame 160 and the movement preventing members 212 and 214. The movement preventing members 212 and 214 are formed in one unified body with the seat 210, and the movement preventing members 212 and 214 are made of the same material as the seat 210, for example, a plastic material. Accordingly, the supporters 208 and connectors 204 of the lamp holder 200 are tightly interposed between the seat 210 and the movement preventing members 212 and 214 to firmly secure a desired fixing force between the lower frame 160 and the lamp holders 200.

Figure 3A:
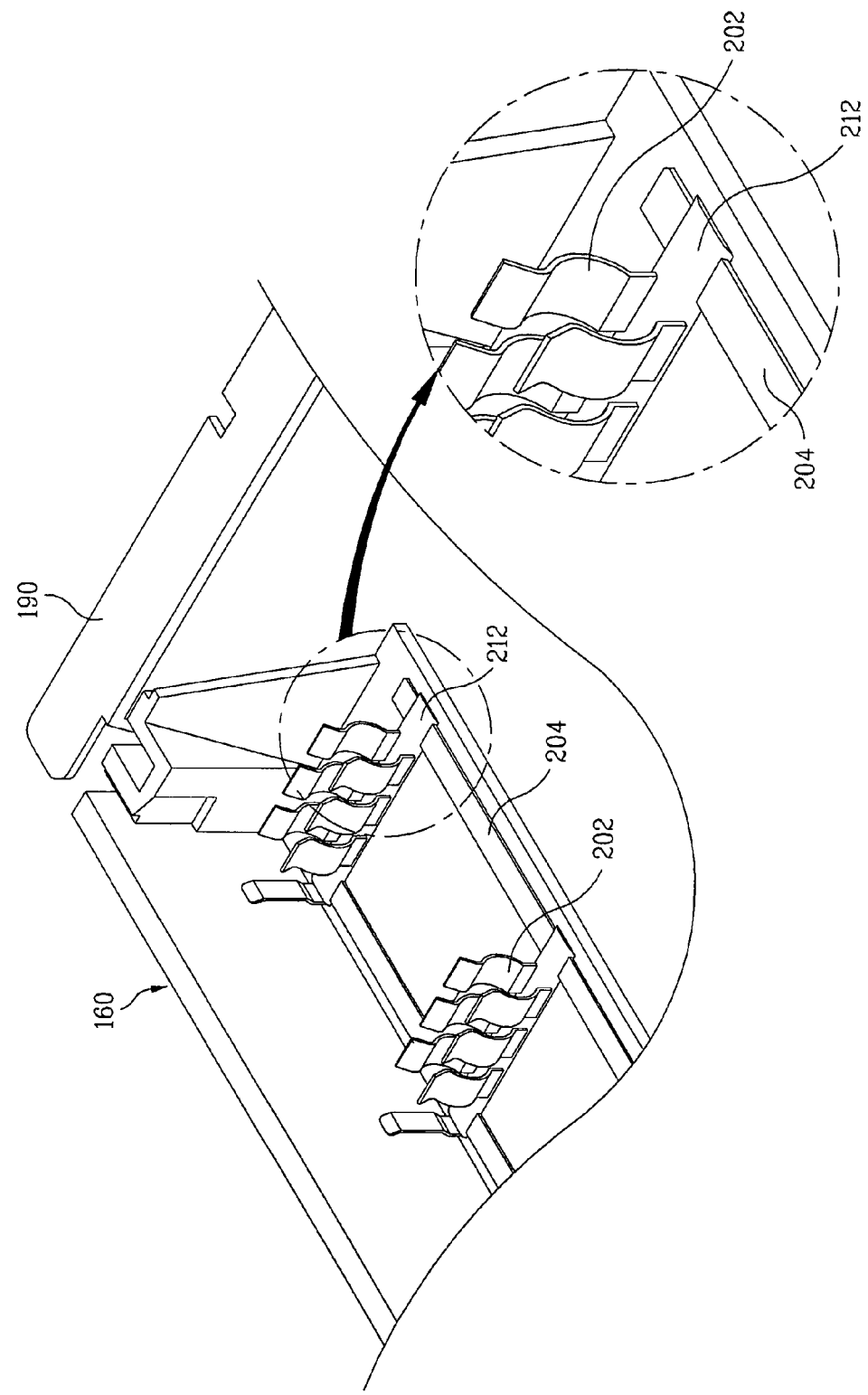
Figure 3B:
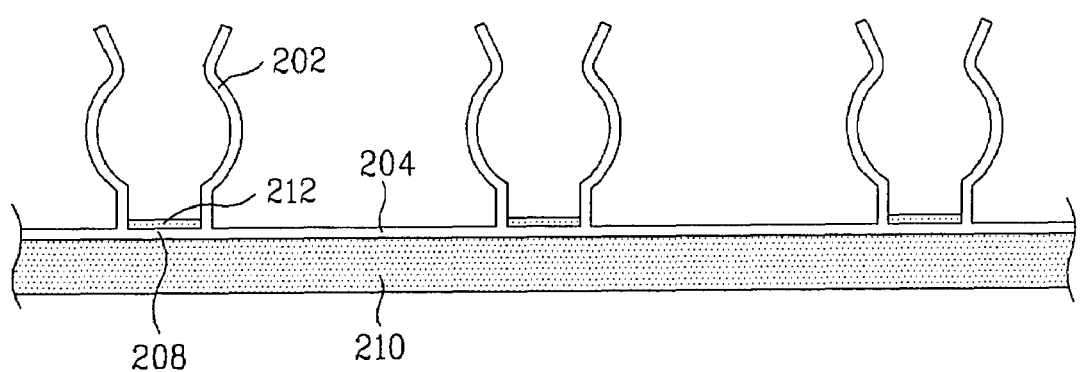
Figure 4A:
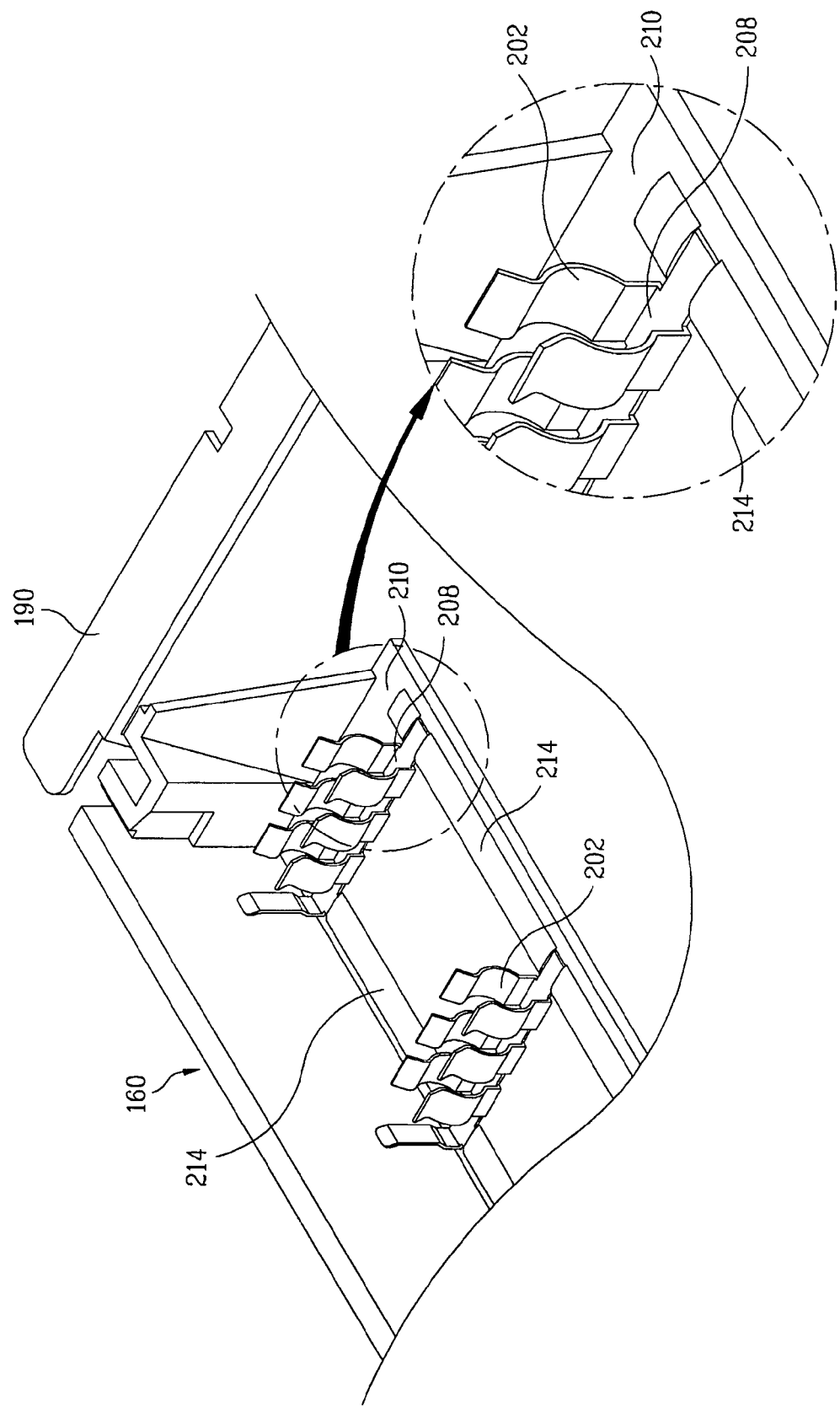
Figure 4B:
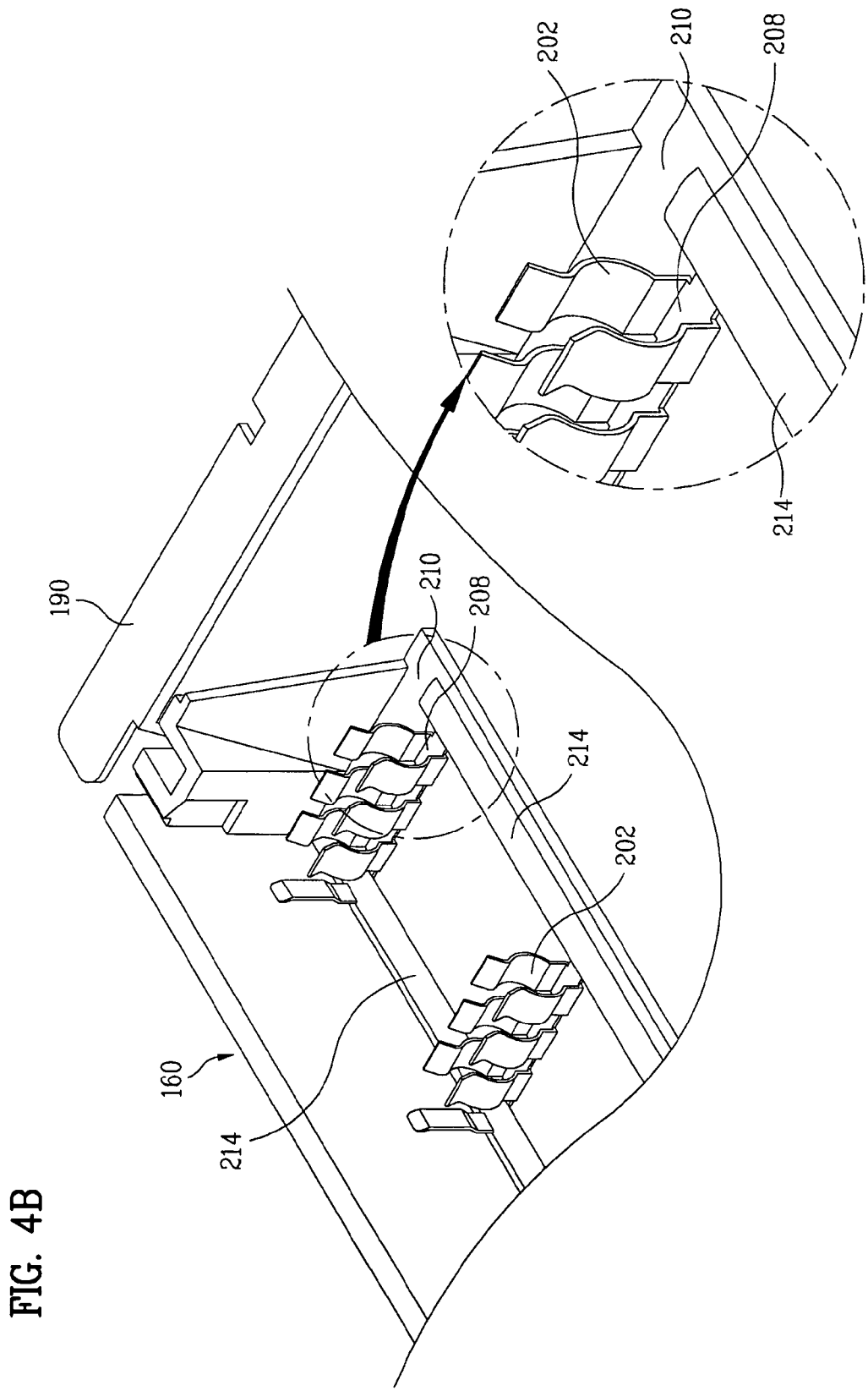
Figure 4C:
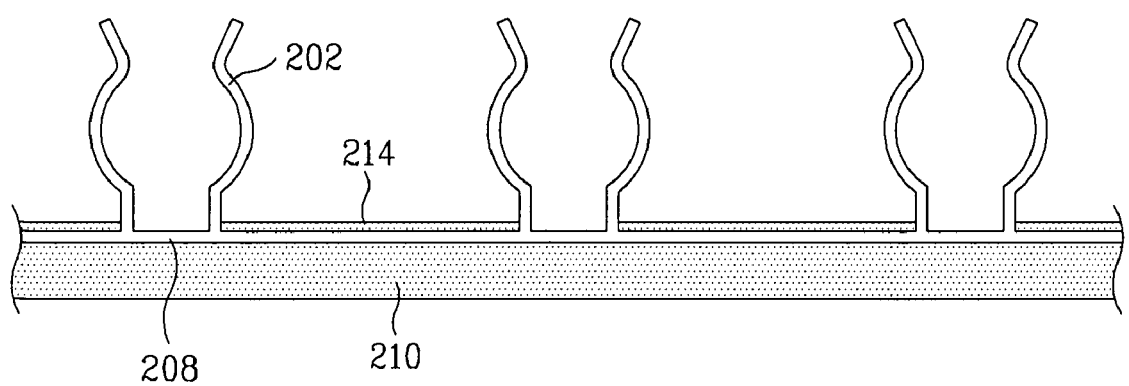
Figure 5:
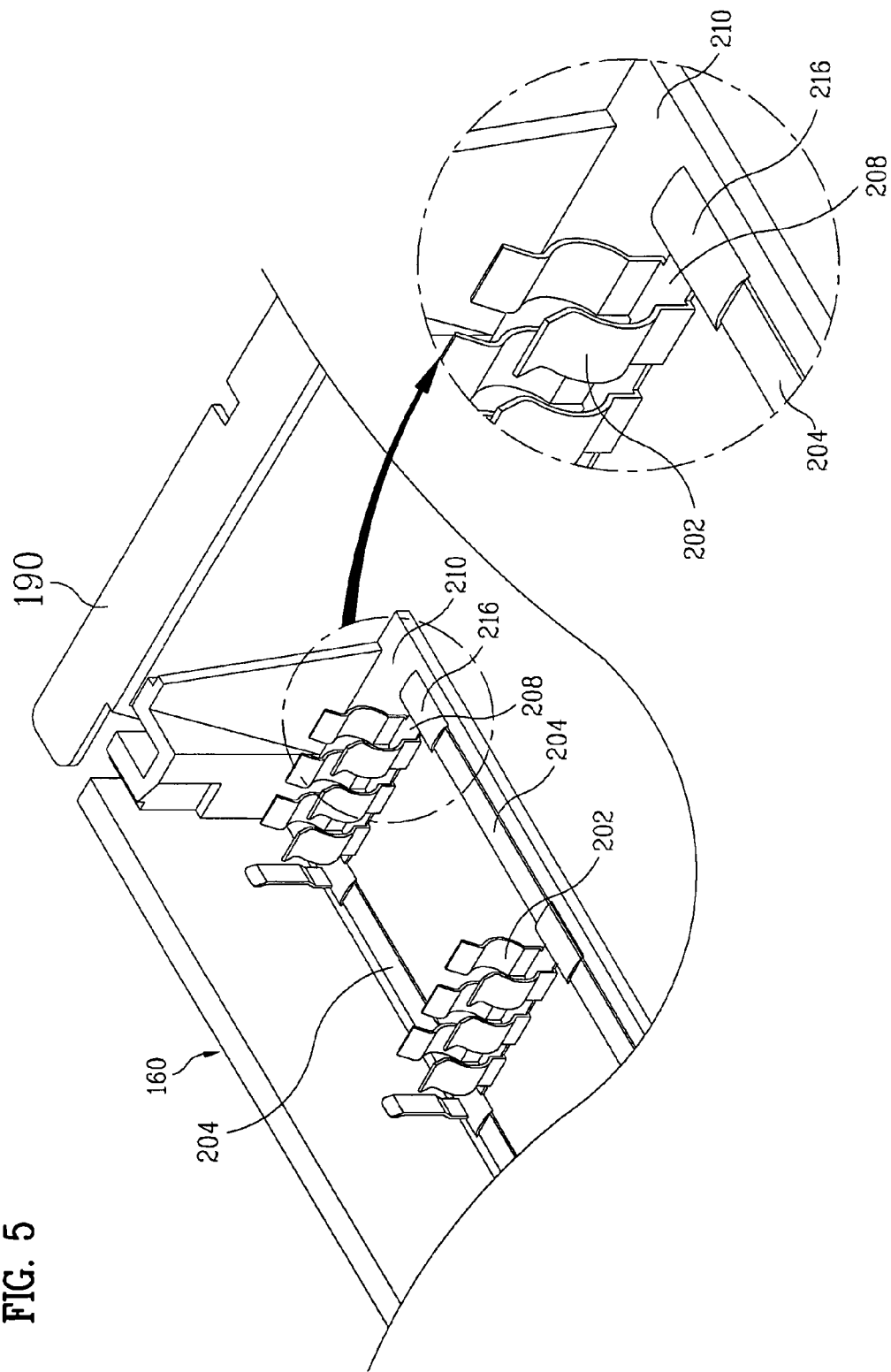
FIG. 5 is a perspective view illustrating lamp holders and a lower frame according to a fourth embodiment of the present invention.

The movement preventing members 212, 214 and 216 may be configured to cover the connectors 204 or the supporters 208. For example, as shown in FIGS. 3A and 3B, each lower frame 160 may include movement preventing members 212 formed to be overlapped with the seat 210 of the lower frame 160 via the supporters 208 of the lamp holders 200. Accordingly, the supporters 208 of the lamp holders 200 are interposed between the movement preventing members 212 and the seat 210. Thus, the supporters 208 are maintained in a state of being unified in one body with the seat 210. Also, as shown in FIGS. 4A to 4C, each lower frame 160 may include movement preventing members 214 formed to be overlapped with the seat 210 of the lower frame 160 via the connectors 204 of the corresponding lamp holder assembly. Accordingly, the connectors 204 of the lamp holder 200 are interposed between the movement preventing members 214 and the seat 210. Thus, the connectors 204 are maintained in a state of being unified in one body with the seat 210. As shown in FIG.

5, each lower frame 160 may include movement preventing members 216 formed to cover the lamp holder 200 only in regions where the supporters 208 and connectors 204 of the lamp holder 200 cross each other. Alternatively, each lower frame 160 may include movement preventing members formed to cover all the supporters 208, connectors 204, and seat 210.

The movement preventing members 212 and 214 may be unified in one body with the supporters 208 and connectors 204 in accordance with a method in which the lower frame 160 is molded, using an insert injection molding method, under the condition in which the assembled lamp holders 200 are inserted in a mold for the injection molding. When the assembled lamp holders 200 are firmly held in the mold, and a molten plastic resin is injected into the mold, to mold the lower frame 160, the movement preventing members 212 and 214 are molded to be unified in one body with the seat 210 such that the supporters 208 and connectors 204 of the lamp holder 200 are interposed between the seat 210 and the movement preventing members 212 and 214. In this case, the melting point of the lamp holders 200 is higher than the melting point of the lower frame 160. In other words, under the condition in which the assembled lamp holders 200 are inserted in the mold in the injection molding process for the lower frame 160, the material of the lower frame 160 which has a melting point lower than the lamp holders 200 is melted by heat, so that the lower frame 160 covers the lamp holders 200. Thus, the lower frame 160 is unified in one body with the connectors 204 and supporters 208 so that a desired fixing force can be secured.

Since each lower frame 160 is unified in one body with at least one of each connector 204 and each supporter 208 as described above, it is unnecessary to use ribs protruded from the side frame 150 to fix the lamp holders 200. Where the lower frame 160 includes the movement preventing members 214 which are formed to cover the connectors 204, heat can be radiated through the supporters 208 or lamp clips 202. Where the lower frame 160 includes the movement preventing members 212, however, which are formed to cover only the supporters 208, heat can be radiated through the connectors 204. Even when heat from the lamps 170 is radiated through the lamp clips 202, it is possible to reduce a problem caused by an increase in temperature. In accordance with the elimination of the ribs, there is no noise caused by the ribs when the lower frame 160 strikes the ribs due to vibrations thereof generated by an electromagnetic force generated in accordance with repeated application of positive and negative AC voltages, or vibrations of a speaker. Thus, the movement preventing members 212, 214, or 216 can surely maintain the lamp holders 200 and lower frame 160 in a fixed state with the method desired by the user without requiring any additional process, because they are molded to be unified in one body with the lower frame 160 in accordance with an insert injection molding method.

As apparent from the above description, in the backlight assembly and assembling method thereof according to the present invention, movement preventing members, which are molded to be unified in one body with the lower frame, are provided. Upon molding the lower frame in accordance with an insert injection molding method, the assembled lamp holders are inserted into a mold. In the molding process, the movement preventing members are molded such that they cover at least one of each supporter and each connector of the lamp holder, to firmly fix the lamp holders. Since the movement preventing members are formed in accordance with the insert injection molding method, the assembly process can be simplified without requiring any additional process. Also, the fixing force between the lower frame and the lamp holders can be increased. Thus, the generation of noise can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight assembly comprising:
   lamps;
   lamp holders each holding at least one of opposite ends of a corresponding one of the lamps, the lamp holders being electrically connected with external electrodes of the lamps; and
   a lower frame formed to partially cover the lamp holders such that the lower frame is formed in one unified body with the lamp holders,
   wherein the lamp holders comprise: lamp clips for holding the lamps; supporters for supporting the lamp clips; and connectors for connecting the supporters at opposite ends of the supporters, respectively; and
   wherein the lower frame comprises: a seat on which the lamp holders are seated; and movement preventing members formed in a unified body with the seat such that a portion of each lamp holder is interposed between the seat and a corresponding one of the movement preventing members.

2. The backlight assembly according to claim 1, wherein each movement preventing member is formed to cover at least one of a corresponding one of the connectors and a corresponding one of the supporters.

3. The backlight assembly according to claim 1, wherein the movement preventing members are formed to cover the lamp holders in regions where the connectors and the supporters cross each other.

4. An assembling method of a backlight assembly, comprising:
   preparing a lower frame formed to partially cover lamp holders such that the lower frame is formed in a unified body with the lamp holders; and
   holding lamps in the lamp holders such that each lamp is held by a corresponding one of the lamp holders at at least one of opposite ends of the lamp;
   wherein the step of preparing the lower frame comprises: preparing the lamp holders such that the lamp holders comprise lamp clips for holding the lamps, and supporters for supporting the lamp clips, and connectors for connecting corresponding ones of opposite ends of the supporters, respectively; arranging the lamp holders in an injection mold for the lower frame; and injecting a molten plastic resin into the injection mold, to mold the lower frame such that the lower frame is formed with movement preventing members; and
   wherein each movement preventing member is formed to cover at least one of a corresponding one of the connectors and a corresponding one of the supporters.

5. An assembly method of a backlight assembly, comprising:
   preparing a lower frame formed to partially cover lamp holders such that the lower frame is formed in a unified body with the lamp holders; and
   holding lamps in the lamp holders such that each lamp is held by a corresponding one of the lamp holders at at least one of opposite ends of the lamp;

wherein the step of preparing the lower frame comprises:
preparing the lamp holders such that the lamp holders comprise lamp clips for holding the lamps, and supporters for supporting the lamp clips, and connectors for connecting corresponding ones of opposite ends of the supporters, respectively; arranging the lamp holders in an injection mold for the lower frame; and injecting a molten plastic resin into the injection mold, to mold the lower frame such that the lower frame is formed with movement preventing members; and wherein the movement preventing members are formed to cover the lamp holders in regions where the connectors and the supporters cross each other.

* * * * *